United States Patent [19]

Burgdorf et al.

[11] Patent Number: 5,174,636
[45] Date of Patent: Dec. 29, 1992

[54] BRAKE PRESSURE CONTROL APPARATUS AND METHOD

[75] Inventors: Jochen Burgdorf, Offenbach-Rumpenheim; Peter Volz, Darmstadt, both of Fed. Rep. of Germany

[73] Assignee: Alfred Teves GmbH, Frankfurt am Main, Fed. Rep. of Germany

[21] Appl. No.: 705,249

[22] Filed: May 24, 1991

[30] Foreign Application Priority Data

May 25, 1990 [DE] Fed. Rep. of Germany ....... 4016752

[51] Int. Cl.$^5$ .......................... B60T 8/32; B60K 28/16
[52] U.S. Cl. ................................ 303/116.1; 303/115.4; 303/113.2
[58] Field of Search ......... 303/113 R, 115 PP, 116 R, 303/113 TR

[56] References Cited

U.S. PATENT DOCUMENTS

| | | | |
|---|---|---|---|
| 3,715,145 | 2/1973 | Harned et al. | 303/116 |
| 4,765,692 | 8/1988 | Miyake | 303/115 PP |
| 5,026,123 | 6/1991 | Nokubo et al. | 303/115 PP |
| 5,033,800 | 7/1991 | Willmann | 303/116 |

FOREIGN PATENT DOCUMENTS

| | | |
|---|---|---|
| 0369412 | 5/1990 | European Pat. Off. |
| 1655383 | 8/1973 | Fed. Rep. of Germany. |
| 2311789 | 12/1984 | Fed. Rep. of Germany. |
| 3725594 | 1/1989 | Fed. Rep. of Germany. |
| 3727330 | 3/1989 | Fed. Rep. of Germany. |
| 3737466 | 5/1989 | Fed. Rep. of Germany. |
| 2056606 | 3/1981 | United Kingdom. |

*Primary Examiner*—Matthew C. Graham
*Attorney, Agent, or Firm*—Robert P. Seitter; J. Gordon Lewis

[57] ABSTRACT

A brake pressure control for use with automotive vehicles having an anti-locking control system (ABS) and/or a traction slip control system (ASR) is described. Provided in the wheel cylinder (16) is a pressure fluid circuit for pressure modulation, which contains, in addition to the wheel cylinder and the pressure fluid pump, an inlet valve disposed upstream of the wheel cylinder, an outlet valve disposed downstream of the wheel cylinder and a pressure fluid accumulator disposed between the outlet valve and the intake side of the pump, with the accumulator, during the anti-locking control mode (ABS-mode) acting as a pressure relief and, also, isolating the rest of the fluid circuit from the master cylinder and the pressure fluid accumulator. A closed circuit is attained in all phases of the anti-locking control mode and, during the phase of pressure decrease in the anti-locking mode, a very rapid pressure decrease in the wheel cylinder is achieved.

24 Claims, 1 Drawing Sheet

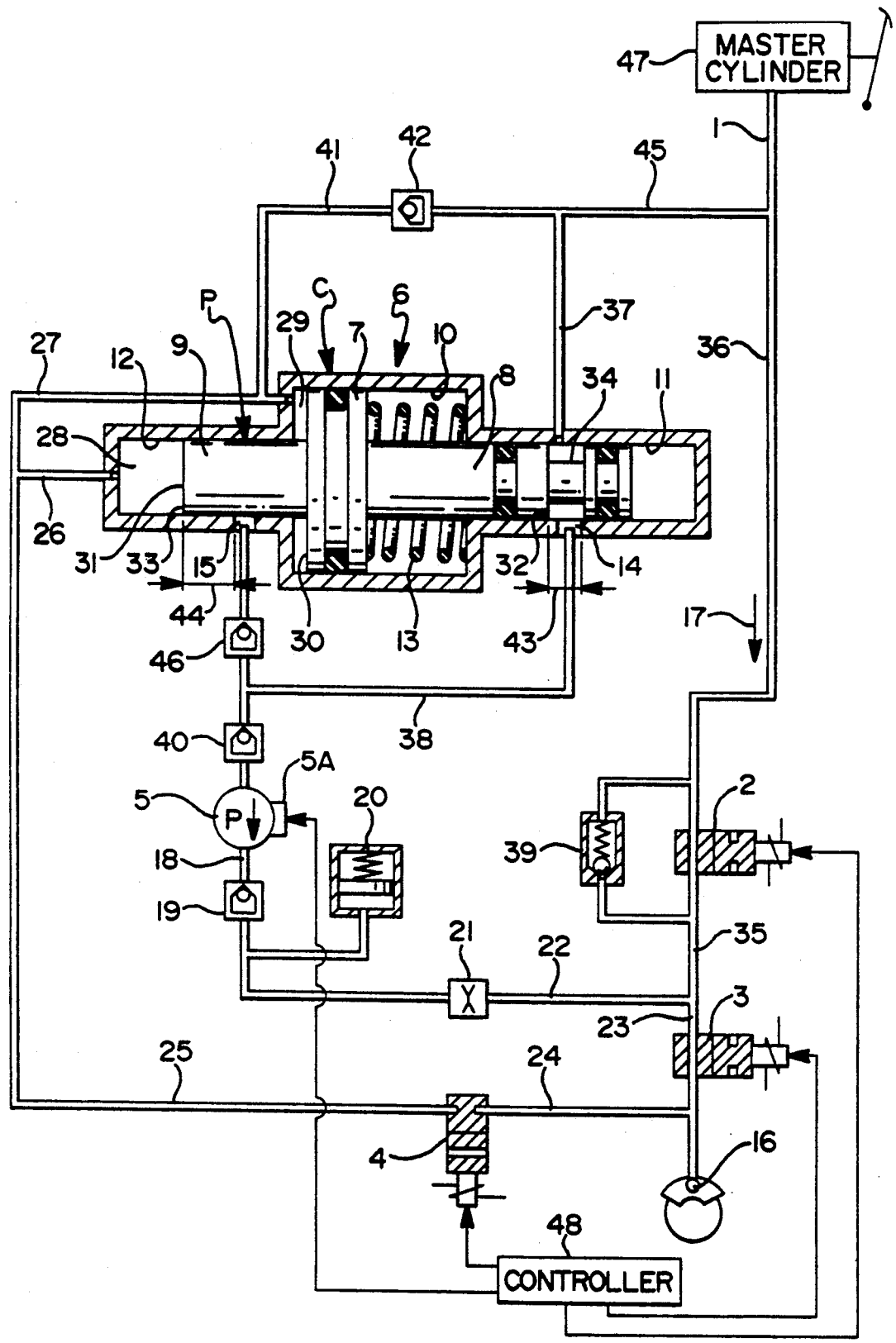

BRAKE PRESSURE CONTROL APPARATUS AND METHOD

The present invention is concerned with a brake pressure control of the type particularly suitable for automotive vehicles, comprising an anti-locking control system (ABS) and/or a traction slip control system (ASR), operating on fluid pressure, and exhibiting at least one inlet and at least one outlet valve for a wheel cylinder operating a wheel brake, at least one motor-driven pump for generating a fluid pressure, and an electronic controller.

The present invention is concerned with wheel brake systems for automotive vehicles of the type that are furnished with an anti-locking control or traction slip control and that contain an electronic controller for controlling the pressure in the wheel cylinders in accordance with a control algorithm to preclude, in the anti-locking control mode, a locking of the wheels and to avoid, in the traction slip control mode, racing of the wheels. In such systems, the controller, such as a suitably programmed digital computer, controls the inlet and outlet valves in accordance with an algorithm stored in the controller, to carry out pressure decrease, constant pressure, and pressure re-increase phases of a predetermined duration, order, speed, etc., in the wheel cylinder.

German unexamined published application No. 3727330 is exemplary of the state of art of this type of brake system.

The aforementioned published application discloses a brake pressure control, in particular, an anti-locking control, for a hydraulic brake system of the type used with automotive vehicles, comprising a master cylinder, a pressure modulator for varying the hydraulic pressure in the wheel cylinders of the wheel brakes during the brake pressure control mode, with the pressure modulator having inlet and outlet valves for the wheel cylinders, at least one motor-driven pump for generating a hydraulic pressure and an electronic controller for controlling the valves of the pressure modulator.

According to the above-mentioned published application, a hydraulic conduit is provided which connects at least one outlet valve to the intake side of the pump and, through valve means, is protected against a pressure decrease.

Moreover, published British Patent Application No. 2056606 discloses anti-locking control systems for automotive vehicles. According thereto, in case of brake lock up, fluid is supplied through a valve to an independent accumulator. During the phase of pressure re-increase, pressurized fluid from the accumulator is pumped back into the wheel cylinder. The accumulator comprises a piston to which pressure is applied through a spring. Also, the piston is configured as a cut off valve which is incorporated in the hydraulic circuit.

The following objects are sought to be achieved by the present invention:

In respect to the anti-locking control mode, in all phases, i.e. in all cases of pressure decrease, constant pressure and pressure re-increase, a closed circuit system is provided for the hydraulic fluid. The intake line between the accumulator and pump required according to the prior art, is eliminated.

Moreover, the provision of a tandem master cylinder of a special design required according to the state of art, is no longer needed.

In addition, it is an object of the invention to attain, in the anti-locking mode, a rapid pressure decrease in the wheel cylinder.

The feed line for supplying additional pressure fluid in the traction slip control mode, usually provided according to the prior art, is eliminated.

Finally, it is an object underlying the invention to prevent the brake pedal, in the anti-locking mode, from taking positions that are likely to irritate the driver.

SUMMARY OF THE INVENTION

The problems encountered in the practice of the prior art brake systems are solved in that a pressure fluid circuit is provided for pressure modulation of the wheel cylinder pressure which comprises, in addition to the wheel cylinder and the pressure fluid pump, an inlet valve located upstream of the wheel cylinder, an outlet valve located downstream of the wheel cylinder and a pressure fluid accumulator disposed between the outlet valve and the pump intake side. The accumulator, especially upon commencement of the pressure decrease phase of the anti-locking control mode, acts as a pressure relief and as a throttle on the intake side of the pump, thereby attaining, especially upon commencement of the anti-locking mode, a rapid pressure decrease in the wheel cylinder.

Moreover, the accumulator is provided with a first controllable area flow opening, within the circuit for the intake side of the pump, and a second controllable area flow opening for the communication between the master cylinder and the intake side of the pump.

According to a preferred form of embodiment, it is provided that the accumulator contains a cylinder wherein a piston is axially movable and sealed against the cylindrical wall, and a force is applied to one end of the piston by a spring. Fluid pressure existing in the circuit is applied to the piston on the other end opposite the spring. The piston, with the circuit pressurized, is held in its resting position by the spring, but may be moved by circuit pressure acting against the spring from its resting position to an advanced switched position. Limited movement of the piston from its resting position prior to reaching its switched position opens the second controllable flow cross-section while maintaining the first controllable flow cross-section closed. The piston, in its switched position, closes the second controllable area flow opening and opens the first controllable area flow opening.

The piston has a first control edge for opening and closing a first port in the cylinder forming the first flow opening, and a second control edge for opening and closing a second part in the cylinder forming the second flow cross-section.

The accumulator piston may be of a stepped diameter configuration.

A cost-saving design is attained in that the first control edge is formed by the end of the piston adjacent the pressure fluid of the circuit, and that the second control edge is formed by an annular groove in the piston.

For the operation of the brake pressure control in the anti-locking control mode (ABS-mode), the pump is activated by an electronic controller, and an electromagnetically actuable-blocking valve disposed between the master cylinder and the inlet valve is switched to the blocking position. The inlet valve and outlet valve are switched in accordance with the control algorithm installed in the controller so that phases of pressure decrease, constant pressure and pressure re-increase are created within the wheel cylinder. The accumulator piston, through the pressure in the circuit, is thereafter moved to the switching position thereby closing the second flow area and opening the first flow area.

Provision is made so that the first flow cross-section has a throttling effect on the intake side of the pump, after a predetermined delay commencing with the closing of the second flow area.

In the event that a positioning of the brake pedal is required during the anti-locking mode, the above method, may advantageously be supplemented, during the anti-locking mode, by the blocking valve being kept open, at least temporarily, to allow pressure fluid delivered by the pump to flow through the opened blocking valve into the pressure chambers of the master cylinder to act therein on the working pistons (push bar pistons, float pistons), thereby positioning the brake pedal.

For the operation of the brake pressure control, in the traction slip control mode (ASR-mode), during the pressure build-up phase, the pump is activated by a controller such as a computer and a blocking valve disposed between the master cylinder and the inlet valve is switched to the blocking position. An outlet valve remains closed, and the piston of the accumulator, through the pressure of the spring, remains in the resting position. The pump, through the cups and the central valves, respectively, of the master cylinder, draws pressure fluid from the master cylinder through the pressure fluid accumulator via the open second flow area, rendering fluid available for the pressure build-up in the traction slip control mode.

Supplementing the afore-described process, the inlet valve and the blocking valve are opened, during the pressure decrease phase in the traction slip control mode.

In addition, provision can be made for that the discharge capacity of the pump be varied by output signals of the controller during the pressure increase and constant pressure phases of the traction slip control mode.

The following advantages will be attained through the invention:

By the arrangement and switching of the afore-described hydraulic function elements, a closed circuit in all phases of the anti-locking mode is achieved. Moreover, a very rapid pressure decrease in the wheel cylinder in the pressure decrease phase of the anti-locking mode, is achieved in the practice of the invention.

Further details of the invention, the problems encountered and the advantages attained will become manifest from the following description of one form of embodiment of the invention.

DESCRIPTION OF THE DRAWING

The Figure is a diagram of the hydraulic circuit according to the disclosed embodiment.

DETAILED DESCRIPTION

In this following description of the embodiment of the invention a familiarity with the state of the art brake systems is presumed, such as described in the afore-mentioned German published patent application.

As set forth above, a closed system, i.e., a closed circuit of the pressure fluid during the anti-locking mode, is to be provided by the invention. Specifically, this means that during the anti-locking mode, the pump and the wheel cylinders are hydraulically interconnected without incorporating a pressure fluid accumulator open to the atmosphere or non-pressurized.

The circuit configuration shown in the Figure is in communication with the master cylinder 47 via conduit 1. The circuit configuration as shown has electromagnetically actuable valves 2, 3, 4; a pump 5 and an accumulator generally designated by reference numeral 6.

The accumulator consists of a stepped diameter cylinder C, with a stepped diameter piston P being axially movable therein. Part 7 of the stepped diameter piston P is of a larger diameter than parts 8 and 9. Correspondingly, part 10 of the cylinder C is of a larger diameter than parts 11 and 12 of the cylinder C.

The stepped piston P, through the compression spring 13, is held in its resting position, moved fully to the left as viewed in the Figure. Cylindrical parts 11, 12 of the cylinder C have one bore 14, 15 each.

Blocking valve 2, is open in the deenergized condition and serves to separate the master cylinder 47 from the hydraulic circuit described hereinafter.

Inlet valve 3 is open in the deenergized condition and provides a controllable inlet for the wheel cylinder 16. Outlet valve 4 (SG valve), closed in deenergized condition, provides a controllable outlet for the wheel cylinder 16.

In the standard brake mode, the valves 2,3,4, take the positions shown in the Figure. The blocking valve 2 and the inlet valve 3 are open, while the outlet valve 4 is in the blocking position.

Hence, pressure is allowed to pass, unimpededly, from the tandem master cylinder 47 to the wheel cylinder 16. The flow direction is symbolized by arrow 17.

In the anti-locking mode, the blocking valve 2 is switched to the blocking position. The inlet and outlet valves 3,4, are switched in accordance with the control algorithm stored in the electronic controller 48. Specifically, this means the following:

In the event of a pressure decrease in the wheel cylinder 16, the inlet valve 3 is closed and the outlet valve 4 opened. To generate a constant pressure phase, the inlet valve 3 is closed and the outlet valve 4 is held in its closed, resting position.

In the phase of pressure re-increase, the inlet valve 3 is opened and the outlet valve 4 closed. In that phase, pressure fluid will be passed to the wheel cylinder 16, through the opened inlet valve 3, from the outlet of the pump 5, via conduit 18, check valve 19, damper 20, orifice 21, conduit 22 and conduit 23.

The operation of accumulator 6 exercising a multi-function will now be described:

During the phase of pressure decrease, the outlet valve 4 is switched to the open position. Pressure fluid is passed into chambers 28, 29 of the accumulator through conduits 24, 25, 26, 27. The stepped piston P is moved to the right through the pressure exerted on the effective surfaces 30, 31 of the stepped piston P.

The control edge 32 of the piston sweeps over the cross-section or opening 14 in the cylindrical part 11. The control edge 32 is formed by an annular groove 34 in part 8 of the stepped piston P.

The control edge 33 on the left-hand front face of the stepped piston P opens the flow cross-section or opening 15.

The control edge 32, during closing of the flow cross-section 14, travels a distance 43, whereas the control edge 33, must travel a distance 44 to open the flow cross-section 15

Provision can be made that the distance 43 be smaller than the distance 44, meaning that first, in the anti-locking control mode, during the pressure decrease phase, communication between the master cylinder and intake side of the pump 5 is discontinued. After a predetermined time interval, the intake side of the pump 5 will be communicated with the circuit.

The pump 5 no longer will be able to deliver pressure fluid from the master cylinder through the pressure fluid accumulator 6, respectively, but rather delivers pressure fluid through expanded space 28, acting as an accumulator, in the afore-described closed pressure fluid circuit.

The expansion of chambers 28, 29, through movement of the stepped piston P to the right, by accepting out flow from the wheel cylinder 16, insures a rapid pressure decrease in the pressure decreasing phase during the anti-locking mode.

The accumulator performs the following functions: rapid volume expansion to accept flow out of the wheel cylinder 16 and insure a fast pressure decrease; throttling on the intake side of the pump; isolating the pump 5 from the master cylinder 47; opening the intake side of the pump 5 to be in communication with the closed pressure fluid circuit.

Once the control algorithm requires a pressure re-increase in the wheel cylinder 16, the outlet valve 4 will be placed into the blocking position; the inlet valve 3 will be opened to provide for a pressure re-increase in the wheel cylinder 16 through the fluid delivered by the pump 5.

The circuit as shown in the Figure, if need be, will be able also to position the brake pedal during the anti-locking mode, for which purpose, the blocking valve 2 is switched to the open position to thereby enable the pump to deliver, through conduits 18, 22, 35, 36, 1, pressure fluid into the working chambers of the tandem master cylinder. Owing to the movement of the working piston (float piston, push rod piston) of the tandem master cylinder caused thereby, the brake pedal will be positioned. Rendering the pump operative and inoperative is controlled by the electronic controller 48 both in the anti-locking control and traction slip control modes. Also means 5A can be made to control the discharge capacity of the pump 5 by the electronic controller 48.

In the traction slip control mode, pump 5 will be rendered operative by corresponding output signals of the controller 48.

The pressure build-up is effected as follows: The blocking valve 2 is closed, the inlet valve 3 remains in its open position while the outlet valve 4 remains in its blocking position. Hence, the pressure fluid delivered by the pump 5 is able to build up pressure in the wheel cylinder 16.

As the stepped piston P of the accumulator 6, in that condition, is in its resting position as shown in the Figure, the flow area 14 is opened. The pump 5 is, therefore, able to draw in, through conduits 1, 45, 37, annular groove 34 and conduit 38, pressure fluid from the master cylinder 47 via the pressure fluid accumulator 6. In the master cylinder 47, the pressure fluid flows either across the piston cups or through the opened central valves (not shown) in the master cylinder 47.

The constant-pressure phase is generated as follows: The outlet valve 4 remains in its closed position and the inlet valve 3 is closed.

The pressure decrease is generated as follows: The inlet valve 3 and the blocking valve 2 are opened thereby enabling pressure fluid to flow off into the non-pressurized working chambers (not shown) of the tandem master cylinder 47, from where it is discharged into the accumulator.

The circuit shown in the Figure is provided with a pressure relief valve 39 preventing a maximum permitted pressure level, during control, from being exceeded. Once that pressure level is reached, the pressure relief valve 39 will open.

Provided before and behind the pump 5 is one check valve 40, 19 each. In addition, a connecting conduit 41 between conduit 27 and conduit 1 is provided which exhibits a check valve 42.

A check valve 46 is disposed between pump intake side and accumulator 6 and is in the blocking position in conduit 38 leading to the accumulator.

We claim:

1. An antiskid-antislip brake control system for an automotive hydraulically operated wheel brake of the type including a wheel cylinder, a master cylinder for generating fluid under pressure, a brake pedal operating said master cylinder, fluid pressure circuit means communicating fluid under pressure from said master cylinder to said wheel brake cylinder, said control system comprising:

a controller for operating said system;

a pump having an intake side and an output side, said pump controllably activated by said controller to supply fluid under pressure to said fluid pressure circuit means to enable pressurizing said wheel cylinder;

an inlet valve actuatable by said controller interposed between said pump output side and master cylinder and said wheel cylinder to selectively cut off communication therebetween;

an outlet valve actuatable by said controller connected to selectively allow outflow from said wheel brake cylinder;

accumulator means including an accumulator chamber in communication with said wheel cylinder to receive outflow from said wheel cylinder, said accumulator means including a movable accumulator member movable from a resting position to a switched position, said movable accumulator member defining in part said accumulator chamber and exposed to fluid pressure therein tending to move said accumulator member from said resting position to said switched position, and means applying a resisting force to said movable accumulator member urging said movable accumulator member to said resting position which means is overcome by the pressure of said fluid inflow into said accumulator chamber from said wheel cylinder;

first valving means operated by said movable accumulator member controlling communication between said intake side of said pump and said accumulator chamber; and second valving means also operated by said movable accumulator member controlling communication between said pump intake side and said master cylinder.

2. The brake control system according to claim 1 wherein said first valving means is closed with said movable accumulator member in said resting position and is opened upon movement of said movable accumulator member a predetermined distance to said switched position against said resisting force and said second valve means is opened with said movable accumulator member in said resting position and is closed by movement of said movable accumulator member a predetermined distance to said switched position.

3. The brake control system according to claim 2 wherein said predetermined distance traveled by said accumulator member to open said second valve means is less than said predetermined distance traveled by said accumulator member to open said first valve means, whereby communication with said master cylinder with said pump intake side is first closed and thereafter an interval during which said intake side of said pump is throttled to achieve a rapid pressure decrease in the wheel cylinder.

4. The brake control system according to claim 2, wherein each of said first and second valve means comprises a variable area flow opening, and wherein said flow area of said first valve means is progressively opened by movement of said movable accumulator member in response to fluid pressure in said accumulator chamber, said flow area of said second valve means progressively closed by said piston movement.

5. The brake control system according to claim 2 wherein said controller closes said blocking valve and outlet valve during an antislip control mode and activates said pump and said movable accumulator member is in said resting position whereby fluid is drawn out of said master cylinder by said pump intake side to pressurize said wheel cylinder.

6. The brake control system according to claim 1 wherein said movable accumulator member comprises a piston and said accumulator comprises an accumulator housing having said piston slidably mounted therein and defining together with said piston said accumulator chamber, said means for applying a resisting force to said piston comprising a spring.

7. The brake control system according to claim 6 wherein said piston has a large diameter center section and a smaller diameter first end portion extending from one side of said center section, a second smaller diameter end portion extending from an other side of said center section, a first port in said accumulator housing initially closed and subsequently opened by movement of said first piston end portion as said piston moves from said resting position to said switched position, a second port in said accumulator housing initially opened and subsequently opened as said piston moves from said resting position to said switched position.

8. The brake control system according to claim 7 wherein said second end portion is formed with an annular relief aligned with said second part with said piston in said resting position, said annular relief drawn past said second port as said piston is moved to said switched position.

9. The brake control system according to claim 8 wherein said first end portion moves from a position past said first port to cover said first port with said piston in said resting position, and the edge of said first end portion moves past said first port when said piston moves to said switched position.

10. The brake control system according to claim 7 wherein said accumulator chamber includes a space adjacent said larger diameter center section and also a space adjacent said first end portion, and wherein said fluid pressure circuit means includes means communicating said wheel cylinder with both of said spaces.

11. The brake control system according to claim 10 wherein said spring engages said larger diameter section of said piston.

12. A brake pressure control of the type particularly suitable for automotive vehicles having a wheel brake operated by a wheel cylinder, a brake pedal, a master cylinder connected to said wheel cylinder and operated by said brake pedal to generate fluid pressure to operate said wheel cylinder, with an anti-locking and traction slip control system, and operating on fluid pressure, said anti-locking control system consisting of at least one inlet valve and at least one outlet valve for modulation of pressure in said wheel cylinder, at least one pump for generating fluid pressure, said pump having an intake having a fluid connection to said master cylinder and an output having a fluid connection to said wheel cylinder, a controller, pressure fluid circuit means for pressure modulation of said wheel cylinder to establish controlled pressure increase and decrease phases in said wheel cylinder, said inlet valve disposed upstream of said wheel cylinder interposed between said pump output and said wheel cylinder, said outlet valve connected downstream of said wheel cylinder and opened by said controller during a pressure decrease phase, and pressure fluid accumulator means including an accumulator chamber connected to said wheel cylinder via said outlet valve, said accumulator pressure chamber thereby upon commencement of said pressure decrease phase receiving fluid flow from said wheel cylinder to act as a pressure relief, a fluid connection connecting said pump intake to said master cylinder, further including accumulator operated valve means interposed between said master cylinder and said intake of said pump, means operating said valve means by said accumulator means to normally provide unrestricted flow between said maser cylinder and said pump intake but restricting said fluid connection between said pump intake and said master cylinder only after said accumulator chamber has received fluid flow from said wheel cylinder after commencement of said pressure decrease phase.

13. The brake pressure control according to claim 12, including a fluid connection from said pump intake to said accumulator chamber and wherein said accumulator operated valve means includes a first controllable area flow opening within said pressure fluid circuit means for varying the fluid connection of said intake of said pump with said accumulator chamber, and also includes a second controllable area flow area controlling said fluid connection between said master cylinder and said intake of said pump.

14. The brake pressure control according to claim 12, wherein said accumulator means includes a cylinder, a two ended piston mounted therein to be movable between a resting and a switched position, a spring acting on one end of said piston urging said piston in a direction, means applying fluid pressure from said wheel cylinder to said piston on the other end thereof opposite said spring, said piston normally held in said resting position by said spring, said piston moved to said switched position from its resting position against the force of the spring upon application of a pressure at said wheel cylinder to said piston, said piston, in said resting position, opening said second controllable flow cross-section and closing said first controllable flow cross-section, said piston, in said switched position, closing said second controllable area flow opening and opening said first controllable are flow opening.

15. The brake pressure control according to claim 14 wherein said piston has a first control edge opening and closing a first port in said cylinder forming the first flow area, and a second control edge opening and closing a second port in said cylinder forming the second flow area.

16. The brake pressure control according to claim 15 wherein said piston is stepped.

17. The brake pressure control according to claim 15, wherein said first control edge is formed by said other end of said piston whereat said pressure fluid is applied.

18. The brake pressure control according to claim 17, wherein said second control edge is formed by an annular groove in said piston.

19. A method of controlling brake pressure in an anti-locking control system for a vehicle wheel cylinder operated brake, which wheel cylinder is operated by pressure generated in a master cylinder, said control system including a controller, a pump having an intake and output sides, said control system further including an inlet valve connected between said wheel cylinder and pump output side and said master cylinder, a blocking valve disposed between said master cylinder and said inlet valve, an outlet valve between the wheel cylinder and said intake side of said pump, said inlet valve and said outlet valve controlled by said controller such that pressure decrease, constant pressure and pressure re-increase phases are established in said wheel cylinder, an accumulator including a cylinder, a piston movable in said cylinder against the force of a spring acting on one end of said piston, and an accumulator chamber, defined in part by the other end of said piston opposite said end acted on by said spring and in communication with said wheel cylinder, a fluid connection between said pump intake side and said master cylinder and also between said accumulator chamber and said pump intake side, said method comprising the step of controlling communication between said pump intake and said master cylinder and accumulator chamber respectively by movement of said accumulator piston, said controlling step including the further steps of closing off said fluid connection between said master cylinder and said pump intake side by movement of said accumulator piston caused by pressurizing of said accumulator chamber and opening said fluid connection between said accumulator chamber and said pump intake side by said piston movement caused by pressurization of said accumulator chamber.

20. The method according to claim 19, further including the step of delaying opening of said fluid connection communication between said pump intake side and said accumulator chamber until after closing of communication between said master cylinder and said pump intake side thereby obtaining a throttling effect on the intake of said pump.

21. The method according to claim 19, including the step of opening the blocking valve while closing the inlet valve to direct flow into said master cylinder for positioning of the master cylinder operating brake pedal.

22. The method according to claim 19, further including the step of establishing communication between said pump intake and said master cylinder with said accumulator piston in said resting position while simultaneously closing said blocking valve, thereby supplying said pump with fluid from said master cylinder to pressurize said wheel cylinder.

23. The method according to claim 19, further including the step of holding the inlet valve and the blocking valve in the open position to decrease pressure in said wheel cylinder with said pump operating while controlling traction slip by brake operation.

24. The method according to claim 19, further including the step of varying the capacity of said pump, during the pressure increase and constant phases to control traction slip.

* * * * *